(12) United States Patent
Ijadi-Maghsoodi

(10) Patent No.: US 10,696,527 B2
(45) Date of Patent: Jun. 30, 2020

(54) HOIST DRIVE TRAIN TORQUE SENSOR

(71) Applicant: Goodrich Corporation, Charlotte, NC (US)

(72) Inventor: Bejan Ijadi-Maghsoodi, Diamond Bar, CA (US)

(73) Assignee: Goodrich Corporation, Charlotte, NC (US)

( * ) Notice: Subject to any disclaimer, the term of this patent is extended or adjusted under 35 U.S.C. 154(b) by 200 days.

(21) Appl. No.: 16/025,257

(22) Filed: Jul. 2, 2018

(65) Prior Publication Data

US 2020/0002140 A1 Jan. 2, 2020

(51) Int. Cl.
*B66D 1/48* (2006.01)
*B66D 1/22* (2006.01)
*G01L 3/10* (2006.01)
*B64D 1/22* (2006.01)

(52) U.S. Cl.
CPC .............. *B66D 1/485* (2013.01); *B66D 1/22* (2013.01); *G01L 3/108* (2013.01); *B64D 1/22* (2013.01)

(58) Field of Classification Search
CPC ........... B66D 1/22; B66D 1/485; G01L 3/108; B64D 1/22
See application file for complete search history.

(56) References Cited

U.S. PATENT DOCUMENTS

| | | | |
|---|---|---|---|
| 6,247,680 B1 * | 6/2001 | Cohen .................. | B66D 1/7415 254/333 |
| 6,354,158 B1 * | 3/2002 | Eidem ..................... | B66D 1/46 73/862.56 |
| 7,353,959 B2 * | 4/2008 | Zakula, Sr. ............. | B66C 13/22 212/278 |
| 7,559,533 B2 | 7/2009 | Stockmaster et al. | |
| 7,658,370 B2 | 2/2010 | Rotzler et al. | |
| 8,370,031 B2 * | 2/2013 | Claxton .................... | E02F 3/30 177/135 |
| 8,727,039 B1 * | 5/2014 | Keast ...................... | E21B 44/04 175/203 |
| 10,618,788 B2 * | 4/2020 | Ijadi-Maghsoodi ..... | B66D 1/54 |
| 2004/0099852 A1 * | 5/2004 | Hoffend, Jr. ............ | B66D 1/39 254/331 |

(Continued)

FOREIGN PATENT DOCUMENTS

| | | |
|---|---|---|
| EP | 0144527 A2 | 6/1985 |
| EP | 3181508 A1 | 6/2017 |

(Continued)

OTHER PUBLICATIONS

Extended European Search Report for EP Application No. 19183897.8, dated Nov. 20, 2019, pp. 7.

*Primary Examiner* — Michael E Gallion
(74) *Attorney, Agent, or Firm* — Kinney & Lange, P.A.

(57) ABSTRACT

A drive train for a rescue hoist includes a mounting portion for mounting the drive train within the rescue hoist. A load pin extends through the mounting portion and into a static structure of the rescue hoist to secure the drive train to the rescue hoist. The load pin is configured to sense the strain generated when the drive train imparts torque to the cable drum to rotate the cable drum. The sensed strain is communicated to a computer configured to calculate a torque generated by the drive train based on the sensed strain and further configured to calculate the load on the cable based on the sensed strain.

20 Claims, 6 Drawing Sheets

(56) References Cited

U.S. PATENT DOCUMENTS

| | | | |
|---|---|---|---|
| 2007/0272906 A1* | 11/2007 | Davidson | B66D 1/525 |
| | | | 254/270 |
| 2015/0086299 A1* | 3/2015 | Jamieson | B63C 7/20 |
| | | | 414/139.6 |
| 2015/0379783 A1* | 12/2015 | Sallee | G01L 3/14 |
| | | | 254/266 |
| 2018/0237277 A1* | 8/2018 | Key | B65G 23/44 |
| 2018/0305187 A1* | 10/2018 | Kosterke | B66D 1/58 |
| 2018/0339891 A1* | 11/2018 | Ijadi-Maghsoodi | B64D 1/22 |
| 2020/0017217 A1* | 1/2020 | Maghsoodi | B64D 1/22 |

FOREIGN PATENT DOCUMENTS

| | | |
|---|---|---|
| JP | H06329391 A | 11/1994 |
| JP | H09194193 A | 7/1997 |
| JP | 2006315803 A | 11/2006 |
| WO | WO2016007796 A1 | 1/2016 |

* cited by examiner

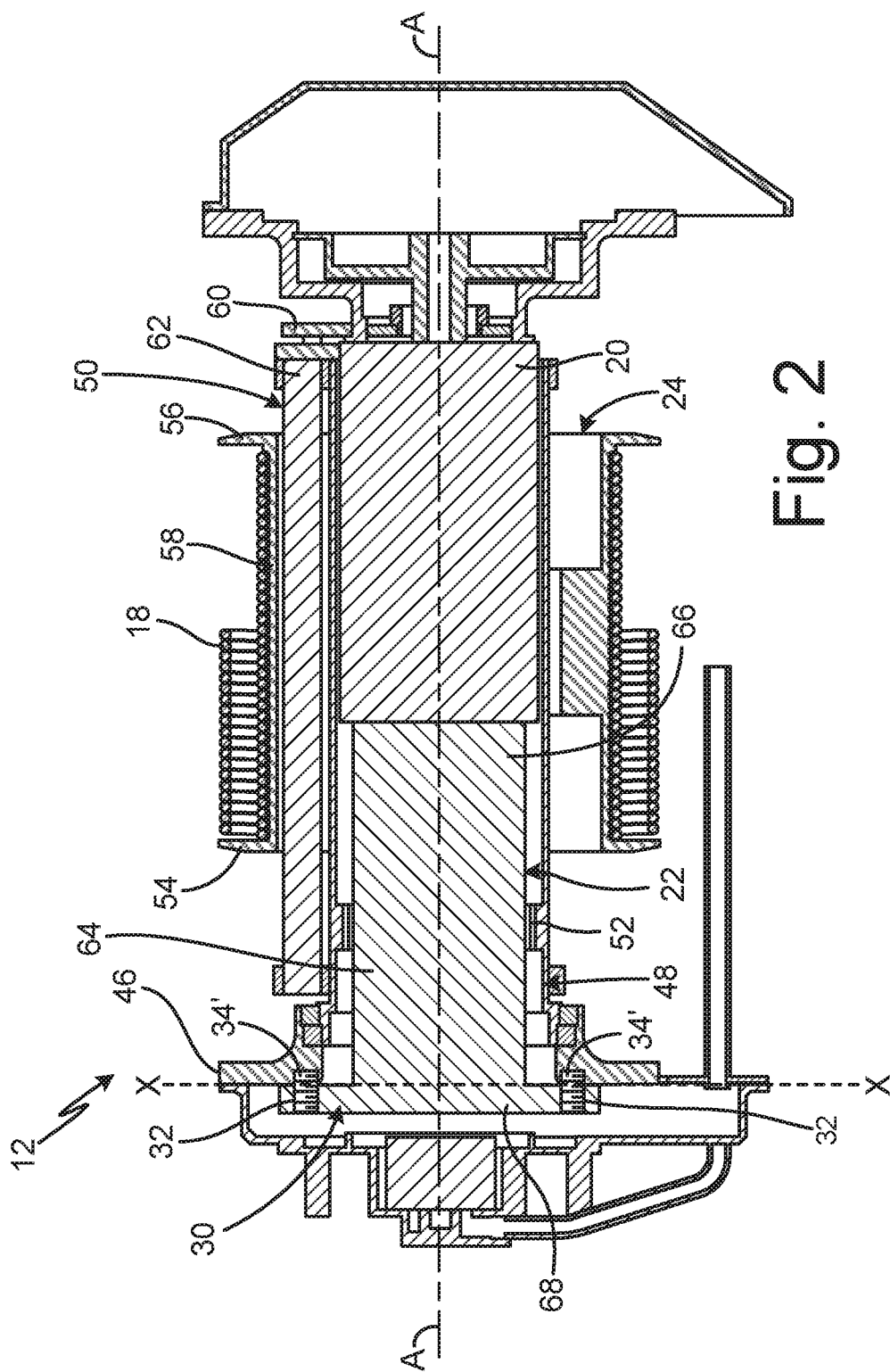

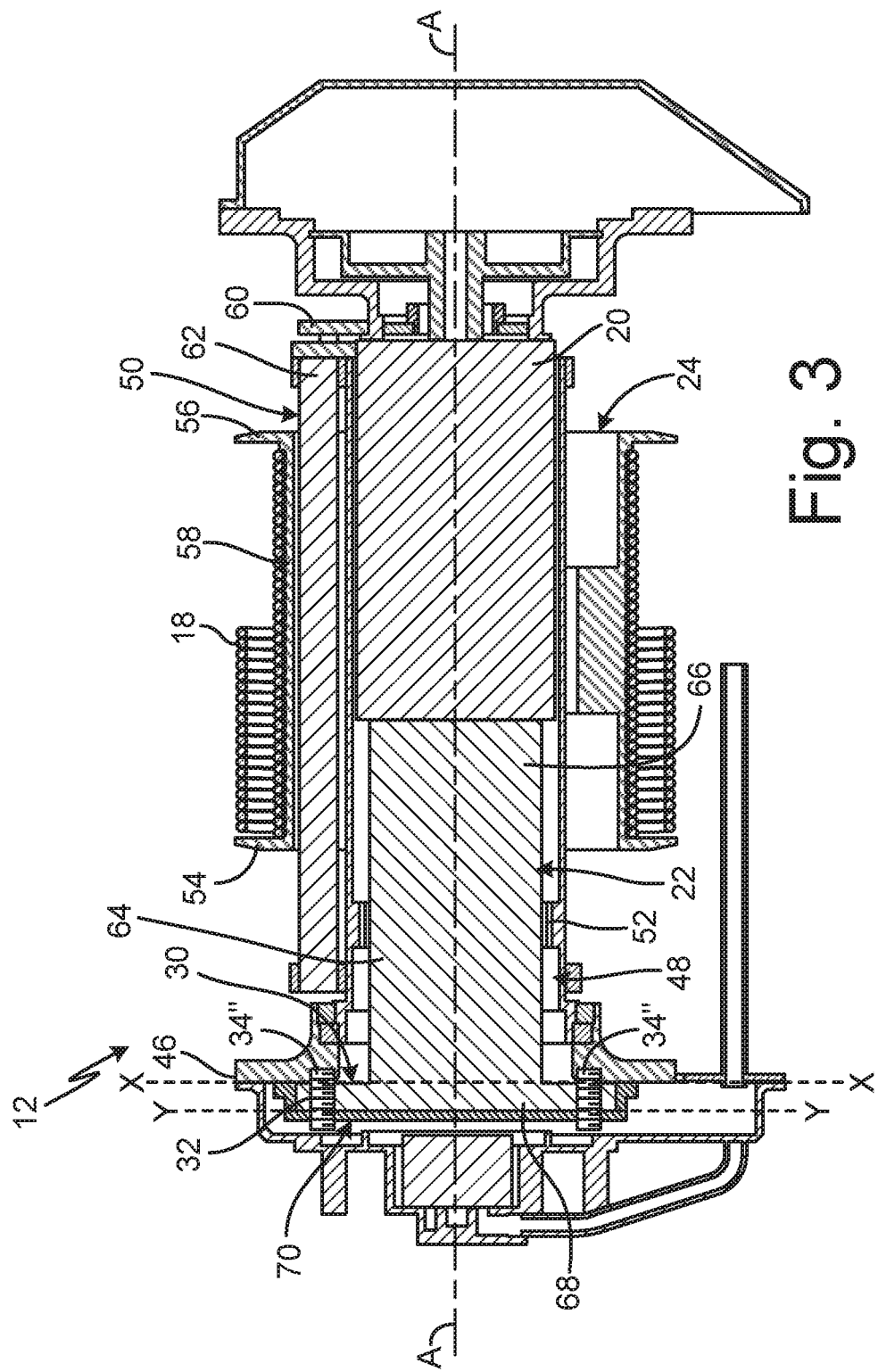

HOIST DRIVE TRAIN TORQUE SENSOR

BACKGROUND

This disclosure relates generally to hoists. More particularly, this disclosure relates to rescue hoists for aircraft.

Rescue hoists deploy and retrieve a cable from a cable drum to hoist persons or cargo, and the rescue hoist may be mounted to an aircraft, such as a helicopter. The rescue hoist includes a drum off of which the cable is deployed. The cable drum rotates to spool or unspool the cable from the cable drum, with one end of the cable attached to the cable drum and the other end, which can include a hook or other device, deployed during operation. The cable drum requires a gear reduction between the motor and the cable drum to provide a desired rotational speed of the cable drum. The torque experienced by the geartrain can be useful for monitoring the life of the geartrain and for calculating the load on the cable.

SUMMARY

According to an aspect of the disclosure, a torque sensing system includes a drive train having a housing with a first end and a second end, the drive train configured to drive rotation of a cable drum; a mounting portion extending radially from the second end; an opening extending through the mounting portion; a load pin extending through the opening and into a static structure of a rescue hoist; and a torque computer communicatively connected to the load pin, the torque computer configured to receive a sensed strain from the load pin and to determine a calculated torque exerted by the drive train on the cable drum.

According to another aspect of the disclosure, a drive train includes a housing having a first end and a second end; a plurality of gear slots extending through the housing between the first end and the second end; a plurality of output gears, wherein each one of the plurality of output gears is disposed in a gear slot of the plurality of gear slots; a mounting portion extending radially from the second end; an opening extending through the mounting portion; and a load pin extending through the opening and into a static structure of a rescue hoist and configured to generate a sensed strain.

According to yet another aspect of the disclosure, a hoist system includes a cable drum rotatable about a cable drum axis; a stationary frame supporting the cable drum; a motor; a drive train disposed on the cable drum axis and configured to provide rotational power to the cable drum from the motor, and a load pin. The drive train includes a housing having a first end and a second end; a plurality of gear slots extending through the housing between the first end and the second end; a plurality of output gears configured to provide rotational power to the cable drum, wherein each one of the plurality of outlet gears is disposed in a gear slot of the plurality of gear slots; a mounting portion extending radially from the second end and disposed adjacent the stationary frame; and an opening extending through the mounting portion. The load pin extends through the opening and into the stationary frame, the load pin configured to generate a first sensed strain in a first shear plane disposed between the mounting portion and the stationary frame.

BRIEF DESCRIPTION OF THE DRAWINGS

FIG. 2 is a cross-sectional view of a rescue hoist.

FIG. 3 is a cross-sectional view of another rescue hoist.

DETAILED DESCRIPTION

Figure 1A:
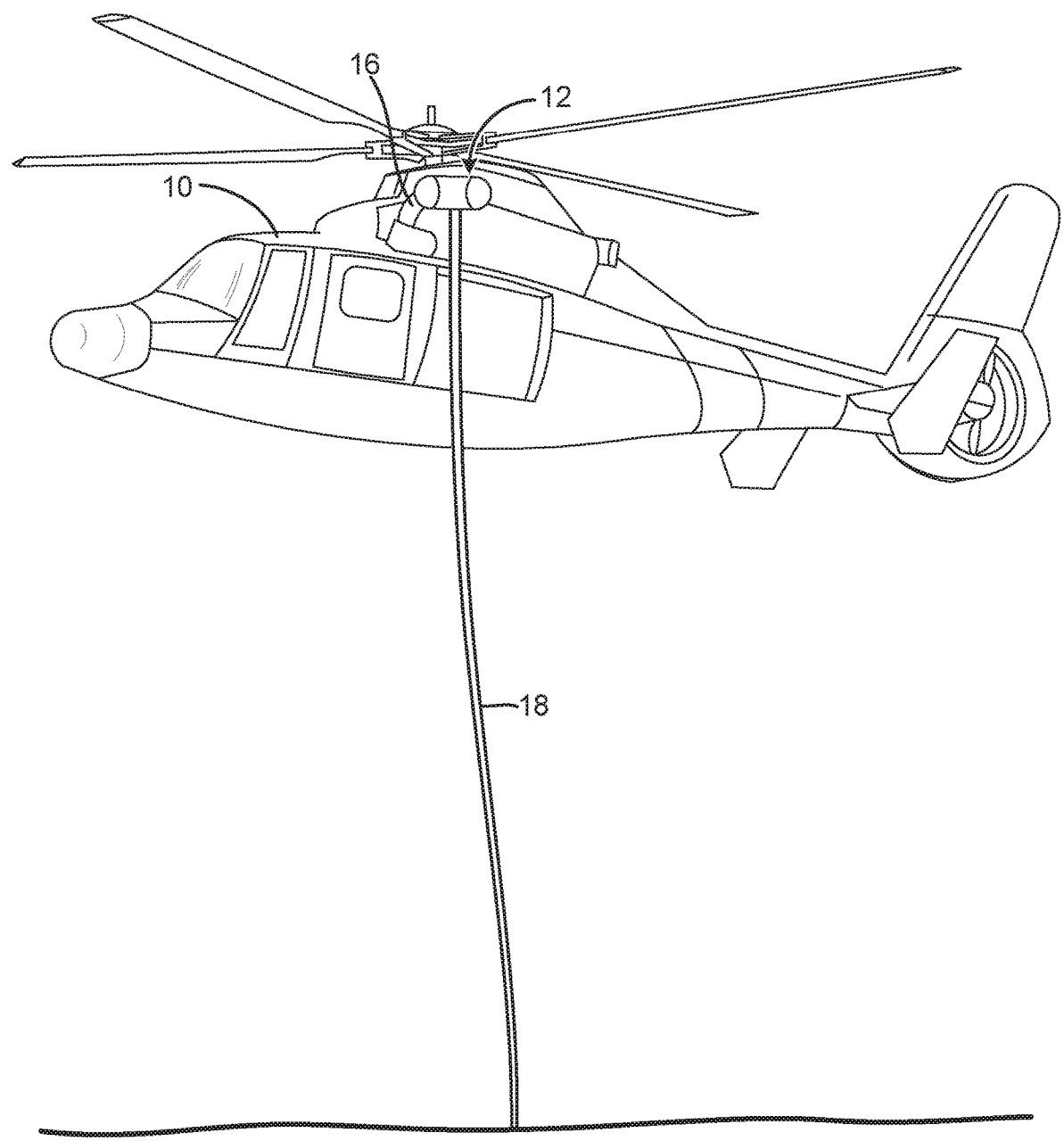
FIG. 1A is a perspective view of an aircraft and rescue hoist.
Figure 1B:
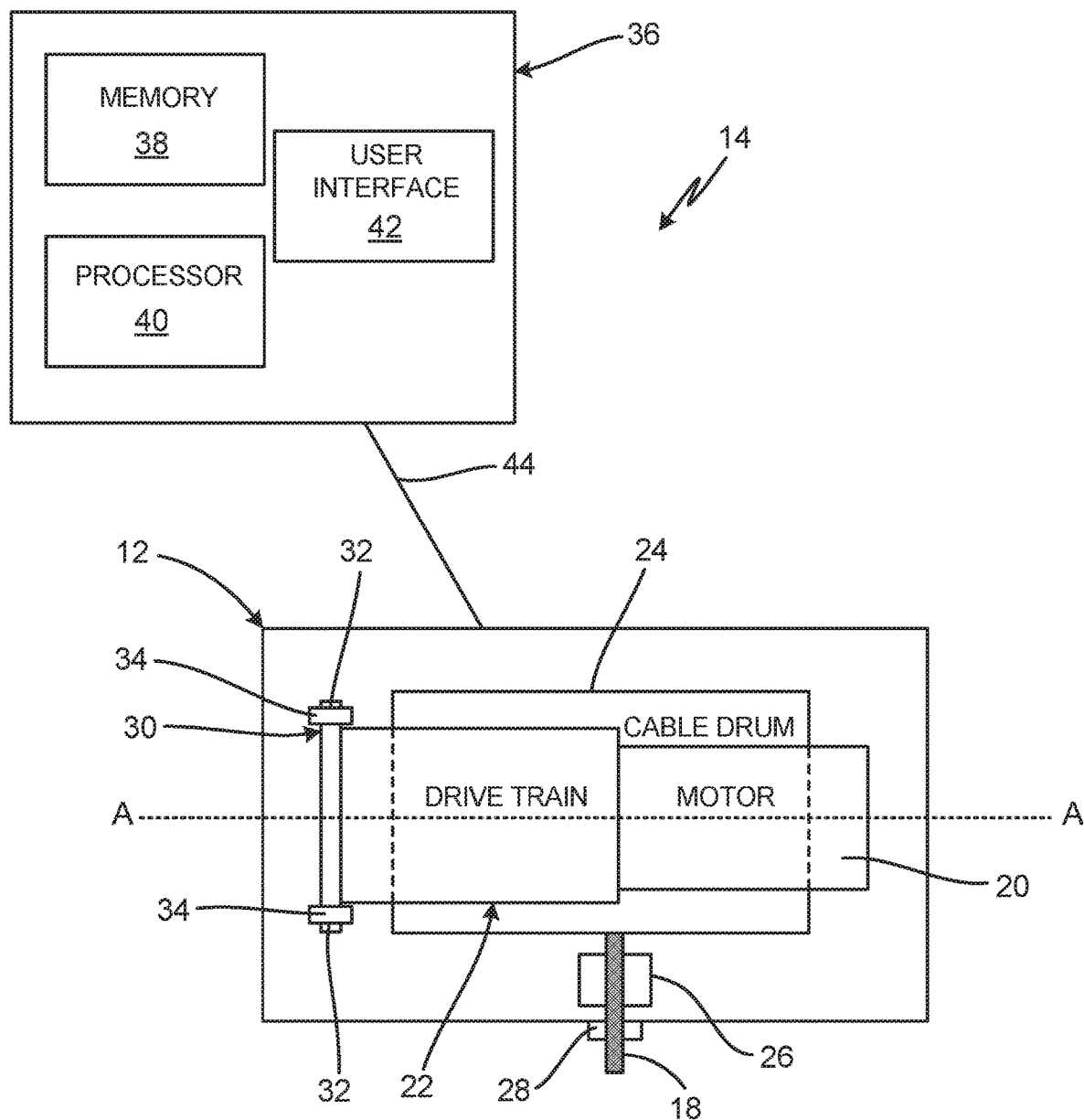
FIG. 1B is a block diagram of a rescue hoist and torque detection system.

FIG. 1A is a perspective view of aircraft 10 and rescue hoist 12. FIG. 1B is a block diagram of rescue hoist 12 and system 14 for detecting and providing information regarding rescue hoist 12. Rescue hoist 12 is mounted to aircraft 10 by support 16, and cable 18 extends from rescue hoist 12. Rescue hoist 12 includes motor 20, drive train 22, cable drum 24, traction sheave 26, and cable guide 28. Drive train 22 includes mounting portion 30, which includes load pin openings 32. Load pins 34 extend through load pin openings 32. System 14 includes computer 36, which includes memory 38, control circuitry 40, and user interface 42.

Rescue hoist 12 is mounted to aircraft 10 by support 16. Cable 18 extends from rescue hoist 12 and is configured to raise and lower objects to and from aircraft 10. Cable drum 24 rotates about and oscillates along cable drum axis A-A to deploy or retrieve cable 18. Drive train 22 extends into a first end of cable drum 24 and is disposed coaxially with cable drum 24. Mounting portion 30 extends radially from a housing of drive train 22. Load pin openings 32 extend through mounting portion 30 and are configured to receive load pins 34. Mounting portion 30 is configured to interface with a static structure of rescue hoist 12, and load pins 34 extend through load pin openings 32 and into the static structure to secure drive train 22 in place on rescue hoist 12. In some examples, mounting portion 30 can include additional openings (not shown) that additional fasteners (not shown) can extend through.

Motor 20 extends into a second end of cable drum 24 and is disposed coaxially with cable drum 24 and drive train 22. Motor 20 is operatively connected to drive train 22 and is configured to provide rotational power to drive train 22. Drive train 22 includes a gear reduction and is configured to output the rotational power received from motor 20 to cable drum 24 to drive rotation and oscillation of cable drum 24.

Cable 18 winds around cable drum 24 and is piled on cable drum 24 in multiple wrap layers. Cable 18 extends from cable drum 24 through traction sheave 26, and cable 18 exits rescue hoist 12 through cable guide 28. Cable guide 28 provides a stationary exit point for cable 18 to exit rescue hoist 12. Traction sheave 26 is configured to maintain a back tension on the portion of cable 18 extending between traction sheave 26 and cable drum 24. The back tension ensures discrete winding of cable 18 on cable drum 24 thereby preventing miswinding, jamming, and/or damage to cable 18.

Load pins 34 extend through load pin openings 32 and into the static structure of rescue hoist 12. Load pins 34 prevent both radial displacement of drive train 22 from and rotation of drive train 22 relative to cable drum axis A-A. In examples where mounting portion 30 includes additional openings, the additional fasteners extending through the additional openings can prevent axial displacement of drive train 22, but it is understood that drive train 22 experiences minimal axial forces during operation such that axial retainers are optional.

Load pins 34 are equidistantly spaced from cable drum axis A-A, and are equidistantly spaced circumferentially about cable drum axis A-A. As such, load pins 34 are spaced 180-degrees apart about cable drum axis A-A where two load pins 34 are included. Load pins 34 are spaced 120-degrees apart about cable drum axis A-A where three load pins 34 are included. It is understood that system 14 can include as many or as few load pins 34 as desired. In some examples, system 14 includes a single load pin 34, while other fasteners extend through mounting portion 30 to prevent undesired movement of drive train 22.

Each load pin 34 includes at least one strain gauge that senses a strain experienced by drive train 22 due to drive train 22 transmitting torque to cable drum 24 from motor 20. The torque causes drive train 22 to experience circumferential force in the direction opposite that in which cable drum 24 is rotating. The strain gauges within load pins 34 sense the shear force at the interface between mounting portion 30 and the static structure of rescue hoist 12. In some examples, load pins 34 are single shear load pins, such as load pins 34' (FIG. 2). Where load pins 34 are single shear load pins, load pins 34 each include a single strain gauge and are thus configured to sense the shear strain in a single plane. In other examples, load pins 34 are double shear load pins, such as load pins 34" (FIG. 3). Where load pins 34 are double shear load pins, load pins 34 each include two strain gauges that are disposed in two shear planes and are configured to sense the shear strain in each of the shear planes. Where load pins 34 are of the double shear configuration, a backing plate is disposed on an opposite side of mounting portion 30 from the static structure of rescue hoist 12, and load pins 34 extend into each of the backing plate, mounting portion 30, and the static structure. The first shear plane is disposed at the interface of the backing plate and mounting portion 30, and the second shear plane is disposed at the interface of mounting portion 30 and the static structure. Strain information from load pins 34 is communicated to computer 36 via communication link 44.

Computer 36 communicates with rescue hoist 12 via communication link 44. Communication link 44 can be a wired or wireless connection. Control circuitry 40, in one example, is a digital logic circuit capable of executing software or other instructions, for example, stored in memory 38. Examples of control circuitry 40 can include any one or more of a microprocessor, a controller, a digital signal processor (DSP), an application specific integrated circuit (ASIC), a field-programmable gate array (FPGA), or other equivalent discrete or integrated logic circuitry.

Memory 38, in some examples, can be configured to store information during operation of computer 36. Memory 38, in some examples, is computer-readable storage media, which can include a non-transitory medium. The term "non-transitory" can indicate that the storage medium is not embodied in a carrier wave or a propagated signal. In certain examples, a non-transitory storage medium can store data that can, over time, change (e.g., in RAM or cache). In some examples, memory 38 is a temporary memory, meaning that a primary purpose of memory 38 is not long-term storage. Memory 38, in some examples, is volatile memory, meaning that memory 38 does not maintain stored contents when power is turned off. In some examples, memory 38 is used to store program instructions for execution by control circuitry 40. Memory 38, in one example, is used by software or applications running on computer 36 to temporarily store information during program execution.

Memory 38, in some examples, can be configured to store larger amounts of information than volatile memory. Memory 38 can further be configured for long-term storage of information. In some examples, memory 38 includes non-volatile storage elements. Examples of such non-volatile storage elements can include magnetic hard discs, optical discs, floppy discs, flash memories, or forms of electrically programmable memories (EPROM) or electrically erasable and programmable (EEPROM) memories.

User interface 42, which may include a keyboard, touchscreen, monitor, mouse, or other suitable interface device, allows a user to interact with system 14, such as by retrieving information from memory 38, receiving notifications, initiating software stored in memory 38, and inputting additional information to memory 38, among other examples. User interface 42 can also be configured to provide an output of information to the user, such as an output of a sensed torque experienced by drive train 22 and/or a load on cable 18. For example, user interface 42 can include a sound card, a video graphics card, a speaker, a display device (such as a liquid crystal display (LCD), a light emitting diode (LED) display, an organic light emitting diode (OLED) display, etc.) or other type of device for outputting information in a form understandable to users or machines.

During operation, cable 18 is deployed and retrieved by rescue hoist 12 to deploy and retrieve objects. When rescue hoist 12 is activated, motor 20 supplies rotational power to drive train 22. The gear train of drive train 22 outputs the rotational input from the motor 20 to cable drum 24 through an intermediate linear bearing, which is discussed in more detail below. Drive train 22 experiences torque, which changes depending on the load on cable 18. As drive train 22 provides torque to cable drum 24, load pins 34 experience a bending moment at the interface between mounting portion 30 and the static structure, which bending moment causes the strain gauge to deform and provide electrical signals that are proportional to the strain that the strain gauge is subjected to. The strain information is provided to computer 36 via communication link 44.

The torque experienced by drive train 22 can be calculated by a torque computer, such as computer 36. The torque information experienced during each lifting event, throughout the mission day, over the lifetime of drive train 22 or over any other desired tracking period can be stored in memory 38. The torque information can be recalled from memory 38 via user interface 42, and maintenance personnel can utilize the torque information to monitor and maintain drive train 22 and rescue hoist 12.

In addition, the strain information produced by load pins 34 can be used to determine the load on cable 18 at any desired time. For example, a look-up table can be stored in memory 38, and computer 36 can calculate the load on cable 18 via the look-up table and based on the strain experienced by load pins 34. Where the look-up table is utilized, the table can provide an output of the load on cable 18 based on the input received from load pins 34. In other examples, the diameter of cable drum 24 is stored in memory 38. Memory 38 can store software that, when executed by control circuitry 40, calculates the load on cable 18 based on the strain information and the diameter of cable drum 24.

Load pins 34 and system 14 provide significant advantages. Load pins 34 provide a sensor that informs the crew of the actual load on cable 18, which improves mission safety by providing the crew with an accurate load reading. Load pins 34 also provide information regarding the torque experienced by drive train 22. The torque information is stored in memory 38 and accessible by maintenance personnel. Knowing the actual torque experienced by drive train 22 throughout operation better informs the maintenance personnel of the maintenance status of drive train 22. As such, maintenance can be performed only when necessary, increasing the useful life of drive train 22. In addition, load pins 34 can be of either a single shear configuration or a double shear configuration, providing load sensing capabilities across a variety of platforms.

FIG. 2 is a cross-sectional view of rescue hoist 12, which includes cable 18, motor 20, drive train 22, cable drum 24, frame 46, linear bearing 48, and level wind mechanism 50. Linear bearing 48 includes input ring 52. Cable drum 24 includes first flange 54, second flange 56, and barrel 58. Level wind mechanism 50 includes level wind gear 60 and screw 62. Drive train 22 includes mounting portion 30 and housing 64. Housing 64 includes first end 66 and second end 68. Mounting portion 30 includes load pin openings 32. Load pins 34' extend into load pin openings 32.

Rescue hoist 12 is configured to be mounted to an aircraft, such as aircraft 10 (FIG. 1A). Linear bearing 48 is rotatably mounted to frame 46. Motor 20 extends from frame 46 and is disposed within linear bearing 48. Drive train 22 extends into frame 46 and is connected to motor 20 and linear bearing 48. Drive train 22 is configured to transmit rotational power from motor 20 to linear bearing 48. Cable drum 24 is mounted to linear bearing 48. Barrel 58 extends between and connects first flange 54 and second flange 56. Level wind mechanism 50 is also mounted to linear bearing 48 and extends through cable drum 24. Cable 18 wraps around barrel 58 of cable drum 24 and is retained between first flange 54 and second flange 56.

Mounting portion 30 extends radially outward from second end 68 of housing 64. Mounting portion 30 can be integrally formed with housing 64 and/or can be secured to housing 64 in any desired manner. In some examples, mounting portion 30 is an annular flange that extends from second end 68. In other examples, mounting portion 30 includes discrete tabs that extend radially from second end 68 and are spaced circumferentially apart around second end 68. Load pin openings 32 extend through mounting portion 30. Load pins 34' extend through load pin openings 32 and into frame 46. Load pin openings 32 can be further subdivided into fastener openings configured to receive fasteners (not shown) and load pin openings configured to receive load pins 34'. For example, mounting portion 30 can include two fastener openings and two load pin openings, but it is understood that mounting portion 30 can include any suitable number of fastener openings and load pin openings. The fasteners extend through the fastener openings and engage frame 46 to axially secure drive train 22. Load pins 34' retain drive train 22 both radially and circumferentially.

During operation, motor 20 is activated and provides rotational power to drive train 22. Drive train 22 includes a gear reduction drive that outputs rotational power to linear bearing 48 via input ring 52, thereby causing linear bearing 48 to rotate about cable drum axis A-A. An output gear of drive train 22 meshes with input ring 52 to provide rotational power to linear bearing 48. In one embodiment, linear bearing 48 is a ball spline bearing, such that linear bearing 48 is capable of transmitting torque to cable drum 24 to thereby cause cable drum 24 to rotate about cable drum axis A-A while also allowing cable drum 24 to translate along cable drum axis A-A. As such, rescue hoist 12 is shown as having a translating configuration, where cable drum 24 both rotates about and translates along cable drum axis A-A.

Level wind mechanism 50 is mounted to linear bearing 48 such that level wind mechanism 50 rotates about cable drum axis A-A with linear bearing 48. Level wind gear 60 is attached to screw 62 and is meshed with teeth on a housing of motor 20. The housing of motor 20 remains stationary as linear bearing 48 rotates such that level wind gear 60 rotates due to level wind gear 60 meshing with the teeth on the housing of motor 20. Level wind gear 60 transmits the resulting rotational power to screw 62, thereby causing screw 62 to rotate. Screw 62 is connected to cable drum 24 through a follower (not shown) that tracks along a thread of screw 62 as screw 62 rotates. The follower maintains a connection with the thread of screw 62 and tracks along the thread such that level wind mechanism 50 causes cable drum 24 to translate along cable drum axis A-A. Translating cable drum 24 along cable drum axis A-A as cable drum 24 rotates about cable drum axis A-A ensures that cable 18 is deployed through a single point instead of through a moving elements on rescue hoist 12.

While rescue hoist 12 is described as having a translating configuration, where cable drum 24 translates along cable drum axis A-A in addition to rotating about cable drum axis A-A, it is understood that cable drum 24 can be of a fixed configuration. In the fixed configuration, cable drum 24 does not translate along cable drum axis A-A. Instead, cable drum 24 rotates about cable drum axis A-A, and rescue hoist 12 includes a translating payout point that ensures level winding of cable 18. Level wind mechanism 50, or any other suitable level wind mechanism, is connected to and drives the translation of the translating payout point. In examples where rescue hoist is of the fixed configuration, the output gears of drive train 22 can be directly meshed with an input ring integral with barrel 58 of cable drum 24.

Motor 20 provides a rotational input to drive train 22, causing rotation of the output gears of drive train 22 through a gear reduction disposed within housing 64 of drive train 22. The output gears of drive train 22 have a "star" configuration where the output gears rotate on their own axes but are fixed relative to the sun gear axis. The output gears mesh with and drive input ring 52. Input ring 52 rotates about cable drum axis A-A and drives rotation of cable drum 24, either through a direct connection with a rescue hoist having the fixed configuration or through linear bearing 48 with a rescue hoist having the translating configuration.

The output gears are supported by bearings that are mounted within housing 64. As such, the torque reaction of drive train 22 is transmitted through housing 64, which is mounted with load pins 34'. In both the translating configuration and the fixed configuration, load pins 34' generate strain information regarding drive train 22. As shown, load pins 34' are in a single shear configuration, such that load pins 34' sense the shear along shear plane X. Shear plane X is disposed at the interface of mounting portion 30 and frame 46, and is the plane along which load pins 34' experience the greatest strain. The torque reaction generates a bending moment on load pins 34' that causes strain along shear plane X, which is perpendicular to cable drum axis A-A. The strain sensors disposed within the load pins generate an electrical signal proportional to the strain experienced, and that strain information is provided to a computer, such as computer 36 (FIG. 1B).

The computer utilizes the strain information to calculate the torque experienced by drive train 22 at any given moment during operation. The calculated torque information can be stored in a memory, such as memory 38 (FIG. 1B), of the computer to be recalled. In addition, the computer can utilize the strain information to generate a calculated load on cable 18. The calculated load can be communicated to the operator via a user interface, such as user interface 42 (FIG. 1B), and/or can be stored in the memory to be recalled. The calculated torque information and the calculated load are utilized by maintenance personnel when performing maintenance on rescue hoist 12. The calculated information can indicate when maintenance is necessary and can provide the level of maintenance required. As such, the strain information regarding drive train 22 reduces maintenance time requirements and maintenance costs. The strain information also provides up-to-date cable load information to the user, such as the pilot or hoist operator, which can be used to detect and address an overload situation. As such, the strain information provides increased operator safety and increased confidence in rescue hoist 12.

FIG. 3 is a cross-sectional view of rescue hoist 12, which includes motor 20, drive train 22, cable drum 24, cable 18, frame 46, linear bearing 48, and level wind mechanism 50. Linear bearing 48 includes input ring 52. Cable drum 24 includes first flange 54, second flange 56, and barrel 58. Level wind mechanism 50 includes level wind gear 60 and screw 62. Drive train 22 includes mounting portion 30 and housing 64. Housing 64 includes first end 66 and second end 68. Mounting portion 30 includes load pin openings 32. Rescue hoist 12 further includes backing plate 70.

Rescue hoist 12, as shown in FIG. 3, is substantially similar to rescue hoist 12, as shown in FIG. 2, except that load pins 34" are in a double shear configuration. Backing plate 70 is disposed on an opposite side of mounting portion 30 from frame 46. Load pins 34 extend through backing plate 70, through load pin openings 32 in mounting portion 30, and into frame 46. In some examples, backing plate 70 is secured to frame 46 by fasteners (not shown) that extend through backing plate 70 and into frame 46. The fasteners secure backing plate 70 directly to frame 46 to prevent circumferential rotation of backing plate 70 relative to cable drum axis A-A. It is understood, however, that in some examples backing plate 70 is supported only by load pins 34.

Rescue hoist 12 includes first shear plane X and second shear plane Y that are each perpendicular to cable drum axis A-A. First shear plane X is disposed at the interface of mounting portion 30 and frame 46. Second shear plane Y is disposed at the interface of mounting portion 30 and backing plate 70. When drive train 22 inputs a driving torque to cable drum 24, the torque reaction is driven through housing 64 and reacted at load pins 34. The torque reaction creates two bending moments with load pins 34 experiencing the greatest strain from the first bending moment in first shear plane X and load pins 34 experiencing the greatest strain from the second bending moment in second shear plane Y.

With load pins 34 having a double shear configuration, each load pin 34 includes a first strain gauge and a second strain gauge. The first strain gauge is positioned within load pin 34 in first shear plane X, and the second strain gauge is positioned within load pin 34 in second shear plane Y. The first strain gauge provides first strain information to the computer, such as computer 36 (FIG. 1B), and the second strain gauge provides second strain information to the computer. The computer can calculate the torque exerted by drive train 22 and/or the load on cable 18 based on the first strain information and the second strain information. As discussed above, the calculated torque and calculated load can be stored in a memory, such as memory 38 (FIG. 1B), for later recall and/or can be communicated to the operator via a user interface, such as user interface 42 (FIG. 1B).

Figure 4:
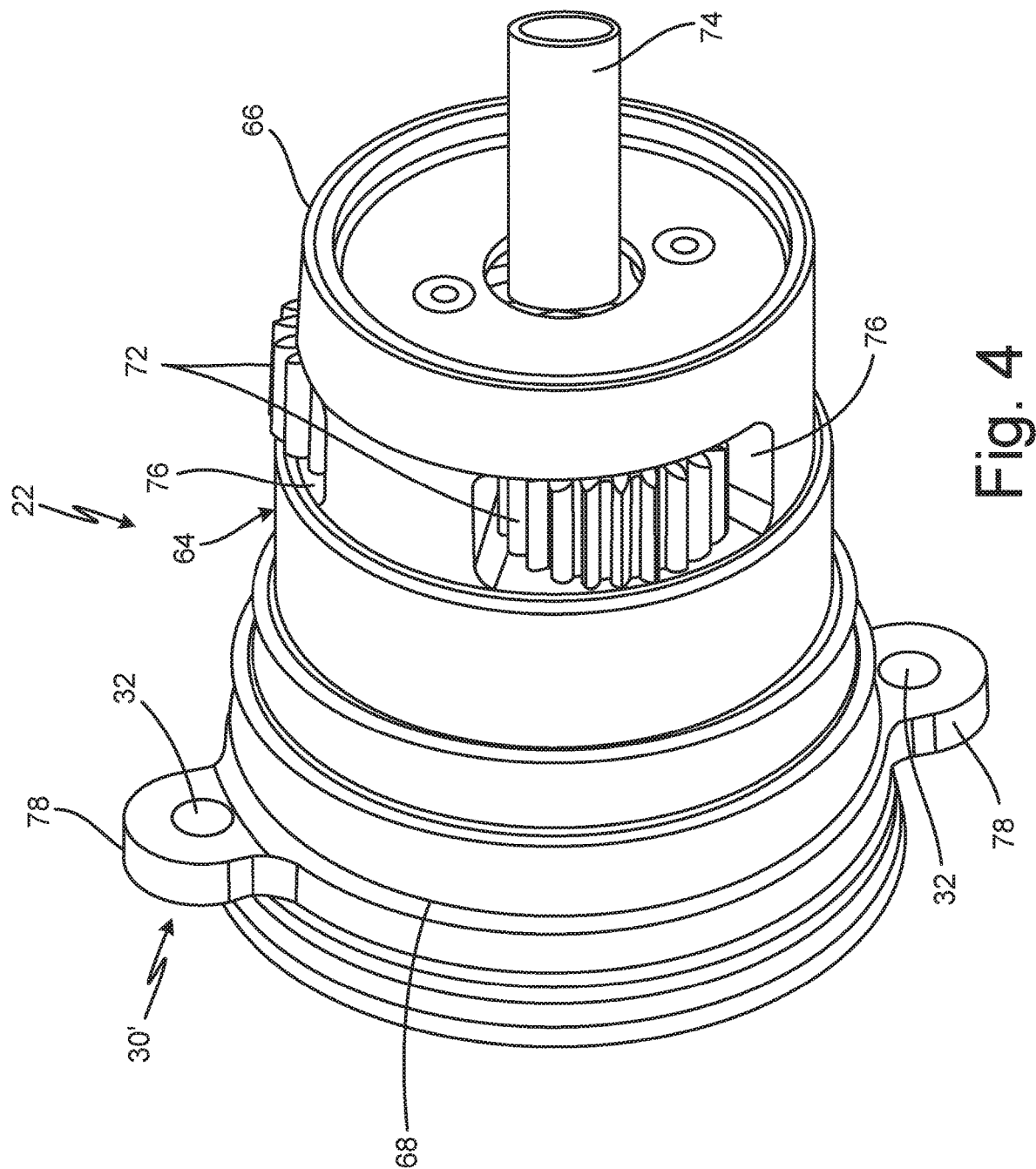
FIG. 4 is an isometric view of a drive train for a rescue hoist.

FIG. 4 is an isometric view of drive train 22. Drive train 22 includes mounting portion 30', housing 64 and output gears 72. Drive shaft 74 of motor 20 (shown in FIGS. 1B-3) is shown. Housing 64 includes first end 66, second end 68, and gear slots 76. Mounting portion 30' includes tabs 78, and tabs 78 include load pin openings 32.

Drive shaft 74 extends into housing 64 through first end 66 of housing 64. Drive shaft 74 engages with a first epicyclic gear reduction disposed within housing 64. In some examples, drive shaft 74 can directly engage with output gears 72 such that drive shaft 74 acts as the "sun" gear and output gears 72 act as the "star" gears. In other examples, housing 64 encloses several epicyclic stages that power various components of drive train 22 and provide several speed reductions between drive shaft 74 and output gears 72. In one example, housing 64 encloses three stages, with the first stage being powered directly by drive shaft 74, the second stage receiving power from the first stage and providing the power to a third stage, and the third stage driving rotation of output gears 72. The other components powered by the various stages can include a brake disc pack and an overload clutch, among other examples. Gear slots 76 extend through housing 64, and output gears 72 extend through gear slots 76. Output gears 72 are rotatably supported in gear slots 76 by bearings (not shown) that are attached to housing 64. Output gears 72 are configured to engage input ring 52 (FIGS. 2 and 3) to provide rotational power to cable drum 24 (FIGS. 1B-3).

Mounting portion 30' is disposed at second end 68 of housing 64. Tabs 78 extend radially from second end 68, and load pin openings 32 extend through tabs 78. Load pin openings 32 are configured to receive load pins, such as load pins 34 (FIG. 1B), load pins 34' (FIG. 2) and load pins 34" (FIG. 3). When output gears 72 rotate and drive input ring 52, the torque reaction is driven through housing 64 to tabs 78. The load pins experience a bending moment and generate strain information based on the magnitude of the bending moment. The strain information is provided to a computer, such as computer 36 (FIG. 1B), where the torque experienced by drive train 22 can be calculated based on the strain information and/or the load on the cable can be calculated. The calculated torque and calculated load can be communicated to the operator and/or can be stored for later use.

Figure 5:
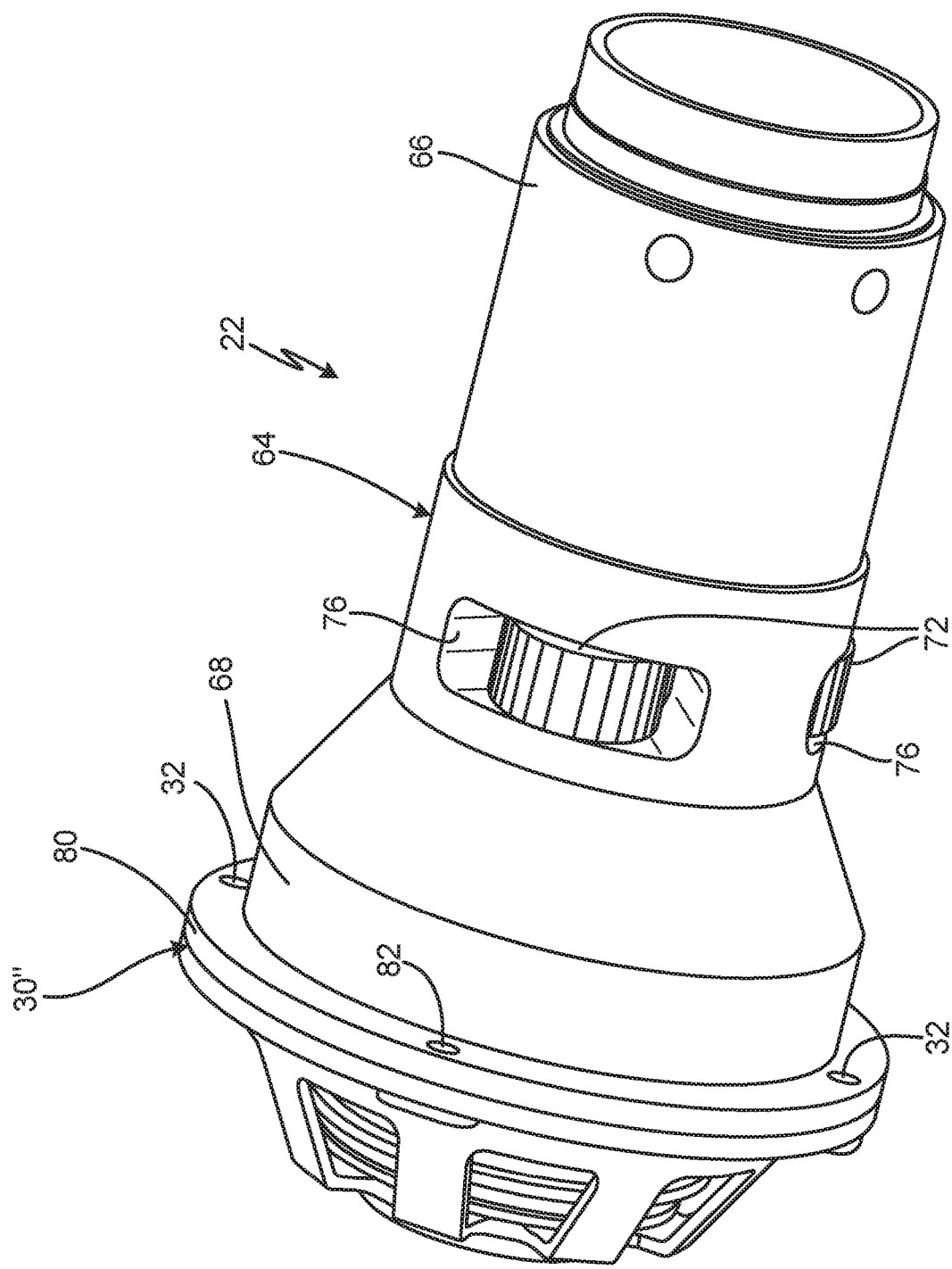
FIG. 5 is an isometric view of another drive train for a rescue hoist.

FIG. 5 is an isometric view of drive train 22. Drive train 22 includes mounting portion 30", housing 64, and output gears 72. Housing 64 includes first end 66, second end 68, and gear slots 76. Mounting portion 30" includes mounting flange 80, and mounting flange 80 includes load pin openings 32 and fastener openings 82 (only one of which is shown).

Drive train 22 is substantially similar to drive train 22 shown in FIG. 4, except mounting portion 30" of drive train 22 includes mounting flange 80 instead of tabs 78. Housing 64 is configured to attach to a frame, such as frame 46 (FIGS. 2 and 3) of a rescue hoist, such as rescue hoist 12 (FIGS. 1A-3). A drive shaft, such as drive shaft 74 (FIG. 4), extends into housing 64 through first end 66 of housing 64 to provide rotational power to output gears 72. Gear slots 76 extend through housing 64, and output gears 72 extend through gear slots 76. Output gears 72 are rotatably supported in gear slots 76 by bearings (not shown) that are attached to housing 64. Output gears 72 are configured to engage input ring 52 (FIGS. 2 and 3) to provide rotational power to cable drum 24 (FIGS. 1B-3).

Mounting portion 30" is disposed at second end 68 of housing 64. Mounting flange 80 is annular and extends radially from second end 68. Load pin openings 32 and fastener openings 82 extend through mounting flange 80. Load pin openings 32 are configured to receive load pins, such as load pins 34 (FIG. 1B), load pins 34' (FIG. 2) and load pins 34" (FIG. 3). Fastener openings 82 are configured to receive fasteners (not shown) that extend through fastener openings 82 and into frame 46 of rescue hoist 12.

The drive shaft provides rotational power to drive train 22, and output gears 72 output the rotational power from the drive shaft to cable drum 24. Output gears 72 rotate and drive rotation of an input ring, such as input ring 52, and the torque reaction is driven through housing 64 to mounting flange 80. The load pins experience a bending moment and generate strain information based on the magnitude of the bending moment. The strain information is provided to a computer, such as computer 36 (FIG. 1B), where the torque experienced by drive train 22 can be calculated based on the strain information and/or the load on the cable can be calculated. The calculated torque and calculated load can be communicated to the operator and/or can be stored for later use.

Discussion of Possible Embodiments

The following are non-exclusive descriptions of possible embodiments of the present invention.

A torque sensing system includes a drive train having a housing with a first end and a second end, the drive train configured to drive rotation of a cable drum; a mounting portion extending radially from the second end; an opening extending through the mounting portion; a load pin extending through the opening and into a static structure of a rescue hoist; and a torque computer communicatively connected to the load pin, the torque computer configured to receive a sensed strain from the load pin and to determine a calculated torque exerted by the drive train on the cable drum.

The torque sensing system of the preceding paragraph can optionally include, additionally and/or alternatively, any one or more of the following features, configurations and/or additional components:

The load pin is a single shear load pin.

The load pin is a double shear load pin.

The torque computer includes a memory, and the torque computer is further configured to store the calculated torque in the memory.

The torque computer is further configured to determine a load on a cable extending from the cable drum based on the sensed strain from the load pin.

A drive train includes a housing having a first end and a second end; a plurality of gear slots extending through the housing between the first end and the second end; a plurality of output gears, wherein each one of the plurality of output gears is disposed in a gear slot of the plurality of gear slots; a mounting portion extending radially from the second end; an opening extending through the mounting portion; and a load pin extending through the opening and into a static structure of a rescue hoist and configured to generate a sensed strain.

The drive train of the preceding paragraph can optionally include, additionally and/or alternatively, any one or more of the following features, configurations and/or additional components:

The load pin is a single shear load pin.

A backing plate disposed adjacent the mounting portion. The load pin extends through the backing plate and the opening and into the static structure.

The load pin is a double shear load pin.

The mounting portion comprises a plurality of tabs extending radially from the second end.

The plurality of tabs include a first tab and a second tab, the first tab offset 180-degrees from the second tab.

The mounting portion comprises a flange extending radially from the second end.

A plurality of the openings are spaced equidistantly about the flange.

The plurality of output gears are supported by the housing such that the output gears are prevented from rotating about an axis of the housing extending between the first end and the second end.

A hoist system includes a cable drum rotatable about a cable drum axis; a stationary frame supporting the cable drum; a motor; a drive train disposed on the cable drum axis and configured to provide rotational power to the cable drum from the motor, and a load pin. The drive train includes a housing having a first end and a second end; a plurality of gear slots extending through the housing between the first end and the second end; a plurality of output gears configured to provide rotational power to the cable drum, wherein each one of the plurality of outlet gears is disposed in a gear slot of the plurality of gear slots; a mounting portion extending radially from the second end and disposed adjacent the stationary frame; and an opening extending through the mounting portion. The load pin extends through the opening and into the stationary frame, the load pin configured to generate a first sensed strain in a first shear plane disposed between the mounting portion and the stationary frame.

The hoist system of the preceding paragraph can optionally include, additionally and/or alternatively, any one or more of the following features, configurations and/or additional components:

A backer plate disposed adjacent a side of the mounting portion opposite the stationary frame. The load pin extends through the backer plate and the opening and into the stationary frame.

The load pin is a double shear load pin further configured to generate a second sensed strain in a second shear plane disposed between the backer plate and the mounting portion.

A torque computer communicatively connected to the load pin, the torque computer configured to receive a sensed strain from the load pin and to determine a calculated torque exerted by the drive train on the cable drum.

The mounting portion comprises a plurality of tabs extending radially outward from the second end.

The mounting portion comprises a flange extending radially outward from the second end.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A torque sensing system comprising:
a drive train having a housing with a first end and a second end, the drive train configured to drive rotation of a cable drum;
a mounting portion extending radially from the second end;
an opening extending through the mounting portion;
a load pin extending through the opening and into a static structure of a rescue hoist; and a torque computer communicatively connected to the load pin, the torque computer configured to receive a sensed strain from the load pin and to determine a calculated torque exerted by the drive train on the cable drum.

2. The torque sensing system of claim 1, wherein the load pin is a single shear load pin.

3. The torque sensing system of claim 1, wherein the load pin is a double shear load pin.

4. The torque sensing system of claim 1, wherein the torque computer includes a memory, and the torque computer is further configured to store the calculated torque in the memory.

5. The torque sensing system of claim 1, wherein the torque computer is further configured to determine a load on a cable extending from the cable drum based on the sensed strain from the load pin.

6. A drive train comprising:
a housing having a first end and a second end;
a plurality of gear slots extending through the housing between the first end and the second end;
a plurality of output gears, wherein each one of the plurality of output gears is disposed in a gear slot of the plurality of gear slots;
a mounting portion extending radially from the second end;
an opening extending through the mounting portion; and
a load pin extending through the opening and into a static structure of a rescue hoist and configured to generate a sensed strain.

7. The drive train of claim 6, wherein the load pin is a single shear load pin.

8. The drive train of claim 6, further comprising:
a backing plate disposed adjacent the mounting portion;
wherein the load pin extends through the backing plate and the opening and into the static structure.

9. The drive train of claim 8, wherein the load pin is a double shear load pin.

10. The drive train of claim 6, wherein the mounting portion comprises a plurality of tabs extending radially from the second end.

11. The drive train of claim 10, wherein the plurality of tabs include a first tab and a second tab, the first tab offset 180-degrees from the second tab.

12. The drive train of claim 6, wherein the mounting portion comprises a flange extending radially from the second end.

13. The drive train of claim 12, wherein the opening is a plurality of openings spaced equidistantly about the flange.

14. The drive train of claim 6, wherein the plurality of output gears are supported by the housing such that the output gears are prevented from rotating about an axis of the housing extending between the first end and the second end.

15. A hoist system comprising:
a cable drum rotatable about a cable drum axis;
a stationary frame supporting the cable drum;
a motor;
a drive train disposed on the cable drum axis and configured to provide rotational power to the cable drum from the motor, the drive train comprising:
a housing having a first end and a second end;
a plurality of gear slots extending through the housing between the first end and the second end;
a plurality of output gears configured to provide rotational power to the cable drum, wherein each one of the plurality of outlet gears is disposed in a gear slot of the plurality of gear slots;
a mounting portion extending radially from the second end and disposed adjacent the stationary frame; and
an opening extending through the mounting portion; and
a load pin extending through the opening and into the stationary frame, the load pin configured to generate a first sensed strain in a first shear plane disposed between the mounting portion and the stationary frame.

16. The hoist system of claim 15, further comprising:
a backer plate disposed adjacent a side of the mounting portion opposite the stationary frame;
wherein the load pin extends through the backer plate and the opening and into the stationary frame.

17. The hoist system of claim 16, wherein the load pin is a double shear load pin further configured to generate a second sensed strain in a second shear plane disposed between the backer plate and the mounting portion.

18. The hoist system of claim 15, further comprising:
a torque computer communicatively connected to the load pin, the torque computer configured to receive a sensed strain from the load pin and to determine a calculated torque exerted by the drive train on the cable drum.

19. The hoist system of claim 15, wherein the mounting portion comprises a plurality of tabs extending radially outward from the second end.

20. The hoist system of claim 15, wherein the mounting portion comprises a flange extending radially outward from the second end.

* * * * *